(12) United States Patent
Kocher

(10) Patent No.: US 7,461,942 B1
(45) Date of Patent: Dec. 9, 2008

(54) LIGHTING SYSTEM

(76) Inventor: Mike Kocher, 4315 - 55th Way North, Kenneth City, FL (US) 33709-5319

( * ) Notice: Subject to any disclaimer, the term of this patent is extended or adjusted under 35 U.S.C. 154(b) by 0 days.

(21) Appl. No.: 11/811,760

(22) Filed: Jun. 12, 2007

(51) Int. Cl.
F21V 1/00 (2006.01)

(52) U.S. Cl. .................. 362/152; 362/353; 362/361

(58) Field of Classification Search ............ 362/351, 362/152, 353, 361, 800
See application file for complete search history.

(56) References Cited

U.S. PATENT DOCUMENTS

| 5,023,595 | A | 6/1991 | Bennett |
| 5,055,984 | A | 10/1991 | Hung et al. |
| 2003/0016536 | A1* | 1/2003 | Lin ............................. 362/250 |
| 2003/0063476 | A1* | 4/2003 | English et al. .............. 362/545 |
| 2003/0193802 | A1* | 10/2003 | Luk ............................ 362/249 |
| 2005/0243549 | A1* | 11/2005 | Ruston ....................... 362/233 |

* cited by examiner

Primary Examiner—Laura Tso
(74) Attorney, Agent, or Firm—Edward P. Dutkiewicz

(57) ABSTRACT

A lighting system comprises an exterior shell and an interior plate. An electrical source comprises a pair of wires. A light emitting diode provides the light source. The system is coupled to a recipient surface, such as a fence post. A circuit controller activates and deactivates the system.

6 Claims, 3 Drawing Sheets

FIG 1
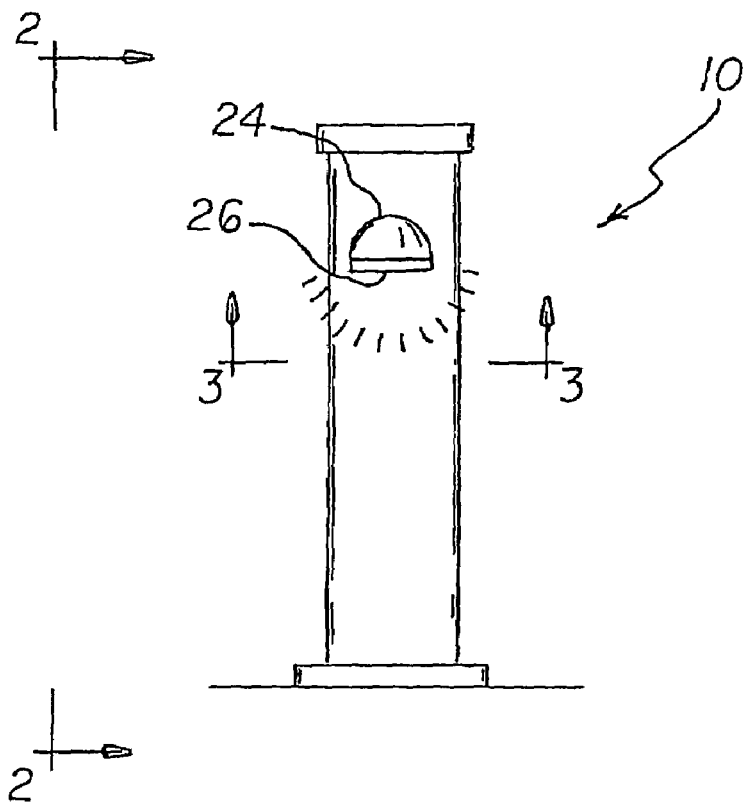
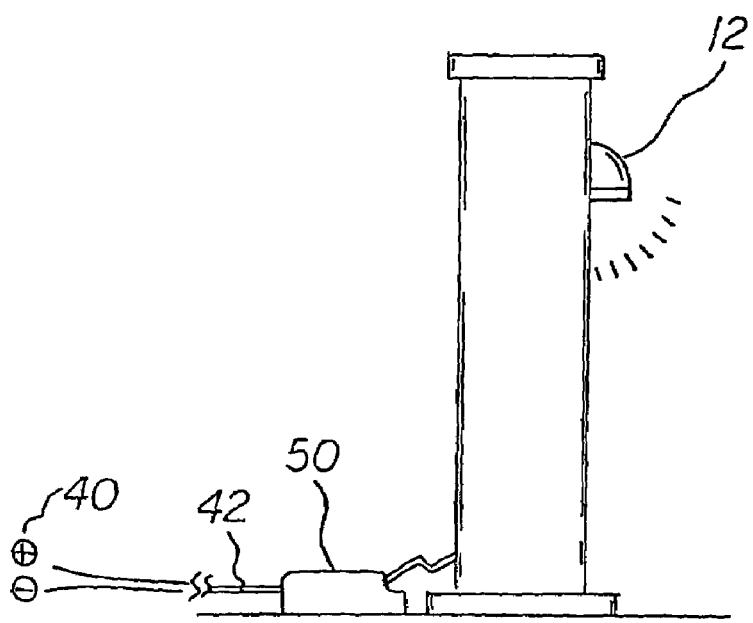
FIG 2

FIG 3
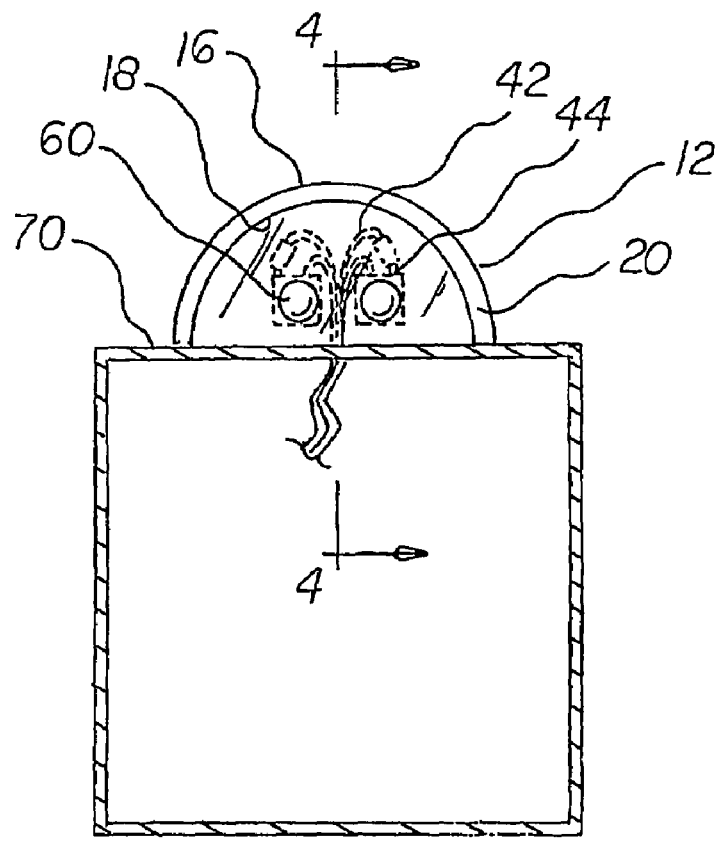
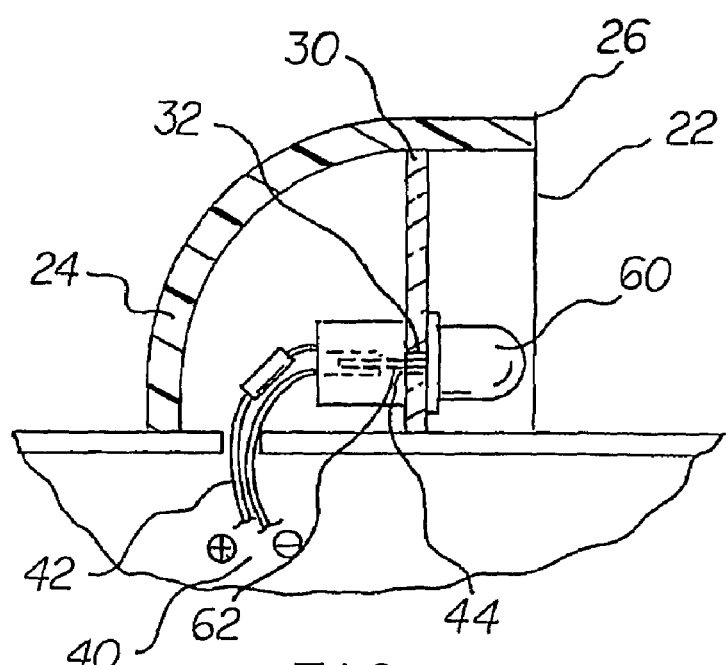
FIG 4

LIGHTING SYSTEM

BACKGROUND OF THE INVENTION

1. Field of the Invention

The present invention relates to a lighting system and more particularly pertains to a means of providing light in remote locations, such as fence posts.

2. Description of the Prior Art

The use of other lighting systems is known in the prior art. More specifically, other lighting systems previously devised and utilized for the purpose of providing a means to illuminate remote locations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,055,984 issued Oct. 8, 1991 to Hung, et al. discloses a Solar Rechargeable Light. U.S. Pat. No. 5,023,595 issued Jun. 11, 1991 to Bennett discloses a Mail Arrival Signal System.

While these devices fulfill their respective, particular objectives and requirements, the aforementioned patents do not describe Lighting System that allows a means of providing light in remote locations, such as fence posts.

In this respect, the Lighting System according to the present invention substantially departs from the conventional concepts and designs of the prior art, and in doing so provides an apparatus primarily developed for the purpose of a means of providing light in remote locations, such as fence posts.

Therefore, it can be appreciated that there exists a continuing need for a new and improved Lighting System which can be used for a means of providing light in remote locations, such as fence posts. In this regard, the present invention substantially fulfills this need.

SUMMARY OF THE INVENTION

In view of the foregoing disadvantages inherent in the known types of other lighting systems now present in the prior art, the present invention provides an improved Lighting System. As such, the general purpose of the present invention, which will be described subsequently in greater detail, is to provide a new and improved Lighting System and method which has all the advantages of the prior art and none of the disadvantages.

To attain this, the present invention essentially comprises a lighting system comprising several components, in combination.

First provided is an exterior shell. The exterior shell has a generally quarter of a sphere configuration. The exterior shell is fabricated of a rigid material, such as plastic or metal. The shell has a convex external surface and a concave inner surface. The opposing internal and external surfaces thus form a wall. The wall has a thickness there between.

The shell has a rounded closed bottom and an open top. The open top and round bottom form an edge about the periphery of the quarter sphere.

Next provided is an interior plate. The interior plate has a generally planar, half-circle, configuration. The interior plate is fabricated of a rigid material. The plate has a plurality of mounting apertures there through. The plate is coupled to the inner concave surface of the exterior shell.

Next provided is an electrical source. The electrical source comprises two wires. The electrical source has an associated mounting plug with the two electrical wires being coupled there to. The coupling of the wires with the mounting plug forming an electrical receptacle.

Next provided is a light emitting diode, or LED. The LED has a pair of conducting prongs. The conducting prongs are coupled with the electrical receptacle. The conducting prongs are electrically coupled to the electrical source.

Lastly provided is a recipient surface. The recipient surface allows for the coupling of the edge of the exterior shell to the recipient surface.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Lighting System which has all of the advantages of the prior art other Lighting Systems and none of the disadvantages.

It is another object of the present invention to provide a new and improved Lighting System which may be easily and efficiently manufactured and marketed.

It is a further object of the present invention to provide a new and improved Lighting System which is of durable and reliable constructions.

An even further object of the present invention is to provide a new and improved Lighting System which is susceptible of a low cost of manufacture with regard to both materials and labor, and which accordingly is then susceptible of low prices of sale to the consuming public, thereby making such Lighting System economically available to the buying public.

Even still another object of the present invention is to provide a Lighting System for a means of providing light in remote locations, such as fence posts.

Lastly, it is an object of the present invention to provide a new and improved lighting system comprising an exterior shell and an interior plate. An electrical source comprises a pair of wires. A light emitting diode provides the light source. The system is coupled to a recipient surface, such as a fence post.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevation of the system in place on a recipient surface, such as a fence post.

FIG. 2 is a side elevation of the system in place on a recipient surface, such as a fence post, the view taken along line 2-2 of FIG. 1. Note the power cord emerging from the lower end of the fence post.

FIG. 3 is an upwardly directed cross-sectional view taken along line 3-3 of FIG. 1.

FIG. 4 is a side cross-sectional view taken along line 4-4 of FIG. 3.

The same reference numerals refer to the same parts throughout the various Figures.

DESCRIPTION OF THE PREFERRED EMBODIMENT

Figure 5:
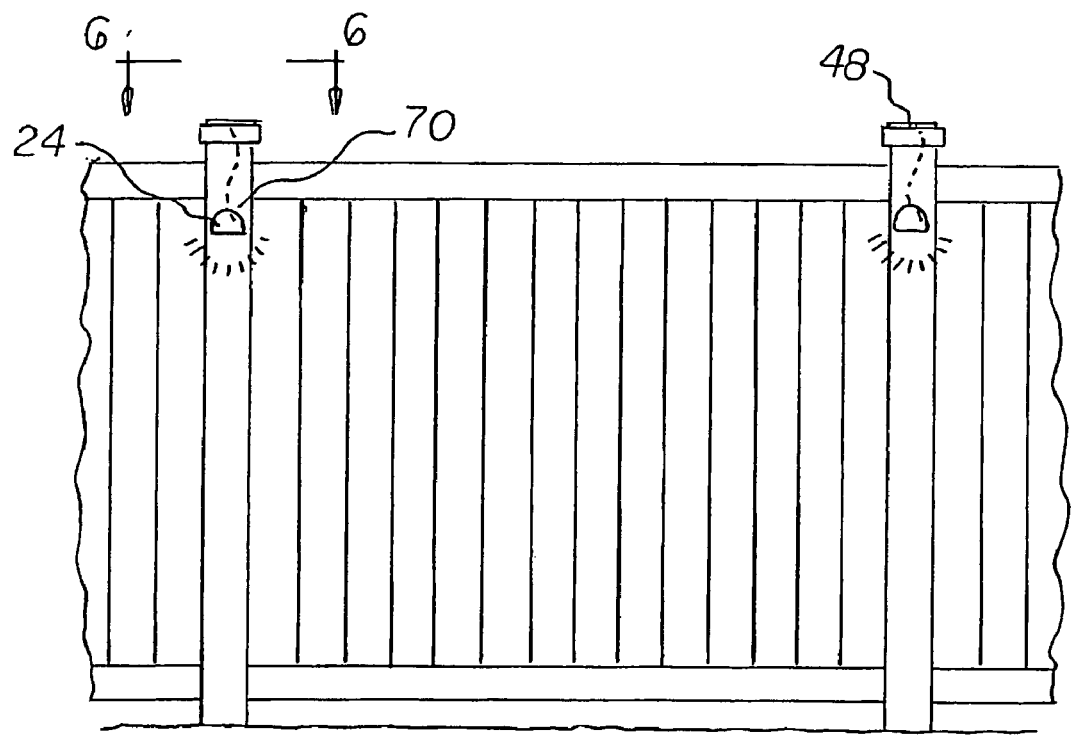
FIG. 5 is a front elevation view of the system configured with solar panels located on the top of the fence posts. Note that the power feed line is contained within the fence post so that no wires are visible, or are minimally visible.
Figure 6:
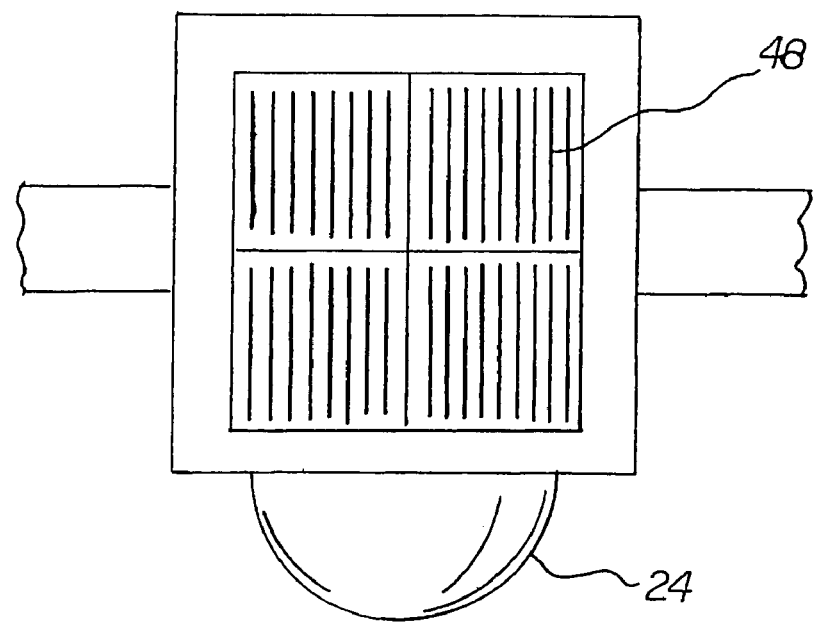
FIG. 6 is a downwardly directed view, taken along line 6-6 of FIG. 5 demonstrating the solar panel and the light viewed from above. Note that the light is directed downward, and may be rotated or placed in any direction according to user's specifications.

With reference now to the drawings, and in particular to FIG. 1 thereof, the preferred embodiment of the new and improved Lighting System embodying the principles and concepts of the present invention and generally designated by the reference numeral 10 will be described.

The present invention, the Lighting System 10 is comprised of a plurality of components. Such components in their broadest context include a shell, at least one LED, an electrical connection and a power source. Such components are individually configured and correlated with respect to each other so as to attain the desired objective.

First provided is an exterior shell 12. The exterior shell has a generally quarter of a sphere configuration. The exterior shell is fabricated of a rigid material, such as plastic or metal. The shell may be transparent, translucent, or opaque. The shell may have a varying degree of opacity, running from transparent to opaque within the same structure.

Of course one skilled in the art would recognize that any material, such as plastic, glass, wood, either synthetic or natural, could be used to construct the shell. The shell has a convex external surface 16 and a concave inner surface 18. The opposing internal and external surfaces thus form a wall 20. The wall has a thickness there between. In the preferred embodiment, the wall thickness is generally uniform. One skilled in the art would recognize that a wall thickness of varying dimensions could also be used, so that the thickness of the sphere wall could be varied.

The shell has a rounded open top 22 and a rounded closed bottom 24. The open top and round bottom form an edge 26 about the periphery of the quarter sphere. The edge comprises a mounting surface. Reference to top and bottom is to achieve relative orientation. As the device can be placed in any orientation, right side up, or up side down, any reference to top or bottom is relative, and should not be construed as limiting, in that no structure is assumed by the words top or bottom.

Next provided is an interior plate 30. The interior plate has a generally planar, half-circle, configuration. The interior plate is fabricated of a rigid material. The plate has a plurality of mounting apertures 32 there through. The plate is coupled to the inner concave surface of the exterior shell.

In another embodiment, the plate is a flat plane, having no holes (not shown). In this configuration the items coupled to the plate are coupled to the surface and do not pass through the plate. The plate may be fabricated of a rigid or semi-rigid material. The plate may be transparent, translucent, or opaque.

Next provided is an electrical source 40. The electrical source comprises two wires 42. The electrical source has an associated mounting plug 44 with the two electrical wires being coupled there to. The coupling of the wires with the mounting plug forming an electrical receptacle.

In the preferred embodiment the electrical source is a direct current, or DC, source, such as a 12 volt source, well known in the art.

In other embodiments, the electrical source may be an alternating, or AC, source, also well known in the art and collectively, both preferred embodiment and other embodiments, demonstrated as reference number 40.

In still another embodiment, the electrical source may be a solar panel 48 having an associated battery for the storage of power captured during sunlight hours. The associated battery is not shown, but is well known in the art.

Next provided is a circuit control 50. The circuit control may be a device such as a light sensor or a timer. This would allow the light system to be illuminated when there is a certain amount of ambient light, or at a certain time. The light sensor may be remote from the light in a location, such as where the system connects to the main power source. The light sensor may also be close to the light system. Such variations represent that the sensor may be place anywhere that the user deems fit. The light sensor may also be electronically connected to the system by a "wireless" linkage, such as radio frequency or light beam, such as infra red light, which is commonly used to carry out operations of known remote control devices. Such a wireless configuration would allow a user to activate the system from a remote location without being "connected" to the system, preventing or decreasing the chance of any electrical shock.

The timer circuit may also be either near the light or remote from it, depending upon user specifications. Timer circuits and light sensors, as well as wireless, infra red and radio frequency controls, are well known in the art and the construction and configuration of such timers and sensors will not be discussed further.

Next provided is a light emitting diode 60, or LED. The LED has a pair of conducting prongs 62. The conducting prongs are coupled with the electrical receptacle. The conducting prongs are electrically coupled to the electrical source. LEDs of varying voltage may be used to produce differing effects, in particular, color of light emitted.

Lastly provided is a recipient surface 70. The recipient surface allows for the coupling of the edge of the exterior shell to the recipient surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lighting system comprising, in combination:
   an exterior shell having a generally quarter of a sphere configuration having an interior and an exterior and an edge, the edge having a thickness;
   an interior plate is coupled to the exterior shell;
   an electrical source; and
   a light emitting diode with the light emitting diode being coupled to the interior plate and electrically coupled to the electrical source.

2. The lighting system as described in claim 1 wherein the exterior shell is fabricated of a rigid material, the shell having a convex external surface and a concave inner surface, the shell having a rounded closed bottom and an open top, forming the edge about the periphery of the quarter sphere.

3. The lighting system as described in claim 1 wherein the interior plate has a generally half-circle configuration.

4. The lighting system as described in claim 3 wherein the interior plate is fabricated of a rigid material.

5. The lighting system as described in claim 4 wherein the plate has a plurality of mounting apertures there through with the plate being coupled to the inner concave surface of the exterior shell.

6. A lighting system comprising, in combination:
   an exterior shell having a generally quarter of a sphere configuration, the exterior shell being fabricated of a rigid material, the shell having a convex external surface and a concave inner surface with a wall thickness there between, the shell having an open top and a rounded closed bottom, forming an edge about the periphery of the quarter sphere;
   an interior plate having a generally half-circle configuration, the interior plate fabricated of a rigid material, the plate having a plurality of mounting apertures there through with the plate being coupled to the inner concave surface of the exterior shell;
   an electrical source comprising two wires, the electrical source having an associated mounting plug with the two electrical wires being coupled there to, the coupling of the wires with the mounting plug forming an electrical receptacle;
   a light emitting diode having a pair of conducting prongs, the conducting prongs being coupled with the electrical receptacle and being electrically coupled to the electrical source;
   a circuit control being electronically coupled to a power source and electronically coupled to the light emitting diode and
   a recipient surface for coupling the edge of the exterior shell there to.

* * * * *